United States Patent
Mytaros (10) Patent No.: US 11,279,110 B2
(45) Date of Patent: Mar. 22, 2022

(54) LEATHER LAMINATE HAVING TEXTURED SURFACE

(71) Applicant: ECCO SKO A/S, Bredebro (DK)

(72) Inventor: Panagiotis Mytaros, Bredebro (DK)

(73) Assignee: ECCO Sko A/S, Bredebro (DK)

(*) Notice: Subject to any disclaimer, the term of this patent is extended or adjusted under 35 U.S.C. 154(b) by 0 days.

(21) Appl. No.: 16/625,618

(22) PCT Filed: Jun. 21, 2018

(86) PCT No.: PCT/EP2018/066670
§ 371 (c)(1),
(2) Date: Dec. 20, 2019

(87) PCT Pub. No.: WO2018/234507
PCT Pub. Date: Dec. 27, 2018

(65) Prior Publication Data
US 2020/0180270 A1    Jun. 11, 2020

(30) Foreign Application Priority Data
Jun. 23, 2017 (DK) .......................... PA 2017 70499

(51) Int. Cl.
*B32B 9/02* (2006.01)
*B32B 9/04* (2006.01)
(Continued)

(52) U.S. Cl.
CPC .............. *B32B 9/025* (2013.01); *B32B 5/12* (2013.01); *B32B 7/12* (2013.01); *B32B 9/047* (2013.01);
(Continued)

(58) Field of Classification Search
CPC .... B32B 9/02; B32B 5/00; B32B 5/02; B32B 5/12; B32B 7/12; B32B 9/04;
(Continued)

(56) References Cited

U.S. PATENT DOCUMENTS

| 6,099,938 A | 8/2000 | Stoyanovich |
| 6,953,621 B2 * | 10/2005 | Schaefer ............ C09D 175/04 427/262 |

(Continued)

FOREIGN PATENT DOCUMENTS

| CN | 1425556 | 6/2003 |
| CN | 1425556 A | 6/2003 |

(Continued)

OTHER PUBLICATIONS

International Search Report and the Written Opinion dated Oct. 17, 2018 From the International Searching Authority Re.: Application No. PCT/EP2018/066670.

*Primary Examiner* — Joanna Pleszczynska
(74) *Attorney, Agent, or Firm* — Lee & Hayes, P.C.

(57) ABSTRACT

The present invention relates to a method for making a leather laminate having a textured surface, and leather laminates made by this method. The laminates comprise a leather layer bonded to a reinforcing fabric with an adhesive, the reinforcing fabric providing strength to the laminate. The method involves dry milling the laminate in humid air, during which the reinforcing fabric constrains the laminate causing the textured surface to form.

14 Claims, 6 Drawing Sheets

(51) Int. Cl.
*B32B 5/12* (2006.01)
*B32B 7/12* (2006.01)
*B32B 38/00* (2006.01)
*C14B 7/04* (2006.01)

(52) U.S. Cl.
CPC ............ *B32B 38/0012* (2013.01); *C14B 7/04* (2013.01); *B32B 2038/0056* (2013.01); *B32B 2305/08* (2013.01); *B32B 2305/18* (2013.01); *B32B 2307/54* (2013.01)

(58) Field of Classification Search
CPC ............ B32B 2305/08; B32B 2305/18; B32B 2307/54; B32B 9/047; B32B 9/025
See application file for complete search history.

(56) References Cited

U.S. PATENT DOCUMENTS

| | | | |
|---|---|---|---|
| 2004/0071895 A1 | 4/2004 | Winkler | |
| 2008/0271344 A1* | 11/2008 | Skirrow | C14B 7/04 36/114 |
| 2010/0222189 A1* | 9/2010 | Washington | A63B 21/0552 482/124 |
| 2011/0020590 A1* | 1/2011 | Yoneda | C14B 7/02 428/91 |
| 2011/0236637 A1 | 9/2011 | Kim et al. | |

FOREIGN PATENT DOCUMENTS

| | | |
|---|---|---|
| CN | 1548644 | 11/2004 |
| CN | 201128843 | 10/2008 |
| CN | 105150620 | 12/2015 |
| CN | 205685861 | 11/2016 |
| CN | 206230976 | 6/2017 |
| CN | 206230976 | 9/2017 |
| DE | 410290 C | 2/1925 |
| DE | 9302479 U1 | 4/1993 |
| DE | 20313449 U1 | 10/2003 |
| DE | 202006007999 U1 | 7/2006 |
| DE | 102011112656 A1 | 7/2013 |
| DE | 202013005126 U1 | 7/2013 |
| EP | 2042047 A2 | 4/2009 |
| EP | 2042047 A3 | 12/2010 |
| EP | 2261382 A1 | 12/2010 |
| EP | 2745721 A1 | 6/2014 |
| EP | 2761034 B1 | 6/2017 |
| GB | 2238753 A | 6/1991 |
| GB | 2255043 A | 10/1992 |
| WO | WO 2006/086854 A1 | 8/2006 |
| WO | WO 2010/131047 A1 | 11/2010 |
| WO | WO 2013/045124 A1 | 4/2013 |
| WO | WO 2014/112404 A1 | 7/2014 |
| WO | WO 2016/113637 A2 | 7/2016 |

* cited by examiner

LEATHER LAMINATE HAVING TEXTURED SURFACE

CROSS REFERENCE TO RELATED APPLICATIONS

This application is a national stage filing under 35 U.S.C. § 371 of International Application No. PCT/EP2018/066670, filed on Jun. 21, 2018, and published as WO 2018/234507 A1, which is based upon and claims priority to Danish Patent Application No. PA 2017 70499, filed on Jun. 23, 2017, the disclosures of which applications are incorporated herein by reference in their entireties.

The present disclosure relates to a method for making a leather laminate having a textured surface, and leather laminates made by this method. The leather laminates are characterised by being thin, strong, and flexible, and by having a uniquely textured surface appearance. The leather laminates have a variety of end uses, including personal items such as shoes, clothes, bags, wallets etc.; furniture such as chairs, sofas, headboards etc.; and automobile upholstering such as seats, dashboards, door trims etc.; and general decorative use.

The properties of leather can vary greatly, depending on the animal from which it is derived and the tanning method used in its production. Generally speaking, strong leathers tend also to be stiff and heavy, and consequently are uncomfortable when made into clothing or other items that need to flex and conform to shape during use. Such leathers are typically made from bovine hides and tend to be vegetable or oil tanned. Chrome-dyed leathers tend to be much softer. The increased softness results in reduced tear and tensile strength.

For instance, GB2238753A discloses leather laminates having a relatively thin outer layer attached to a reinforcing mesh which is optionally made of a polymer material. The resultant laminates retain the advantages of thin leather by being light and soft, yet gain the strength advantages of the reinforcing material in terms of resistance to stretching and tearing.

Leather laminates formed with high strength reinforcing layers are also known, for instance from WO2016/113637. These types of laminates are typically used in protective garments such as work gloves or threat resistant clothing or vests.

Despite the physical and structural properties obtainable with these leather laminates, it is the surface texture and appearance of leather that makes it desirable to use as a material, particularly in the luxury market. The surface texture and appearance of leather derives from the natural fibres and inherent grain structure which varies dependent on the animal or raw material used. Leather hides can also be processed in a number of ways to provide different types of surface finish.

Considering terminology, grain surface is the upper portion or outer covering of the animal whereas split is the under layer which is removed by splitting operation in the leather making/tanning process.

Full grain refers to top grain leather where no sanding of the surface takes place. This leaves the original surface texture visible in the final leather, including hair follicles and any natural scar tissue or other skin defects. Additionally, any natural defects in the hide remain in the final piece, which can create natural lines of weakness that render the leather difficult to use in certain applications. For instance, in applications such as shoes, the natural weaknesses may cause the leather to preferentially bend in the wrong place, making the shoe uncomfortable during use.

Nubuck leathers have the surface layer removed typically by a buffing process. Although the leather still has the pronounced network of natural fibres and corium structure giving the leather strength, the grain surface is effectively completely removed. The resultant leather is thin and workable with moderate strength, but lacks the aesthetic appeal of full grain leather.

The buffing process used to form nubuck leathers leaves protein fibres that produce a velvet-like feel. Artificially embossing nubuck leather can create a surface texture, but often the embossing step damages the protein fibres and undermines the velvet-like feel.

Finally, split leather is created from the fibrous part of the hide left once the top-grain has been separated from the hide, e.g. to be used as full grain or top grain leather. Split grain leather may have reduced strength as compared to comparable thicknesses of top grain leather, as the fibres tend to be more aligned. To compensate for this, split leather may need to be reinforced prior to use. Any grain texture is furthermore embossed on to the final leather.

Only full grain leathers maintain the natural grain and inherent strength of the original hide. When the sample thickness of full grain leather is reduced, the strength drops dramatically rendering them unsuitable for certain uses. Corrected grain and split leathers lack a natural grain. In order to attain a high quality appearance of natural full grain leather, they typically have an artificial grain embossed onto their surface.

There is therefore a continuing need for leather products that have natural grain structures and improved strength.

The present disclosure relates to a method for making a leather laminate comprising:
 i. providing a piece of leather having a first side and a second side;
 ii. laminating a reinforcing fabric comprising high strength fibres to the first side of the piece of leather to provide a leather laminate comprising, in order, the reinforcing fabric, an adhesive and the piece of leather; and
 iii. exposing the leather laminate to water and dry milling the leather laminate to form a milled leather laminate.

The milled leather laminate formed by the method of the disclosure has a unique and aesthetically pleasing surface appearance. It is also naturally formed so is random, lacking any repetitive nature of textures formed by embossing.

The surface structure is believed to arise due to the water causing the leather to expand. However, the combination of adhesive and reinforcing fabric constrains the leather, restricting its ability to change its overall physical dimensions. The expansion caused by the water consequently manifests itself at the surface of the laminate, on the opposite side to the high strength layer (i.e. the second flesh side of the piece of leather). During dry milling, the leather contracts slightly, which augments the surface texture forming a random yet uniformly textural pattern on the second surface. This surface texture is permanently imparted to the second side of the leather, such that the surface retains the texture and appearance even through subsequent processing steps and during use. Moreover, as the texture has been formed by a constrained swelling then contraction, it reduces when the laminate is stretched, unlike artificially embossed surface patterns. It is also evident on the reverse side of the laminate, i.e. in the reinforcing layer itself which typically also becomes textured.

The surface texture and appearance of the leather laminate can be varied, depending on the conditions used and particularly the conditions used in step iii of the method.

For instance, the texture on the surface is typically more extreme if liquid water is used to treat the leather prior to dry milling. The leather also typically takes on a more weathered or worn look. Alternatively, if the leather is exposed to water in the form of humid air during the dry milling itself, the surface texture is more consistent and less pronounced.

Therefore, in one aspect the disclosure relates to a method for making a leather laminate comprising:
i. providing a piece of leather having a first side and a second side;
ii. laminating a reinforcing fabric comprising high strength fibres to the first side of the piece of leather to provide a leather laminate comprising, in order, the reinforcing fabric, an adhesive and the piece of leather; and
iii'. dry milling the leather laminate in humid air to form a milled leather laminate.

In a second aspect, the disclosure relates to a method for making a leather laminate comprising:
i. providing a piece of leather having a first side and a second side;
ii. laminating a reinforcing fabric comprising high strength fibres to the first side of the piece of leather to provide a leather laminate comprising, in order, the reinforcing fabric, an adhesive and the piece of leather; and
iii". soaking the leather laminate in a solution comprising water, then dry milling the soaked leather laminate to form a milled leather laminate.

These two aspects differ in step iii. In the first aspect, the water is introduced to the leather in the form of humid air present in the dry milling step (step iii'). In the second aspect, the water is introduced by soaking prior to dry milling (step iii"). In the second aspect, humid air need not be used during dry milling, and typically the humidity is controlled to reduce the water content of the leather following the soaking.

As used herein, references to step iii should be interpreted as encompassing both step iii' and iii".

The various aspects of the method are set out in more detail below.

Step i. —Providing the Leather

In principle, the method may be carried out with any type of leather. However, typically the leather will have already been tanned and post tanned. Tanning and post tanning of leather is well known in the art and need not be described in detail here.

Any type of tanned leather may be used, including metal tanned (e.g. using chromium, aluminium, zirconium, titanium, iron or combinations thereof), vegetable tanned (e.g. using tannins from bark or other sources), or natural tanning. Typically, the leather is tanned with chrome or vegetable tanned, with chrome tanned leather being most often used.

In principle, there is no upper limit to the thickness of the leather used in the method. However, the reinforcing fabric provides strength to the laminate formed by the method, so the leather need not be overly thick. Moreover, if the leather is too thin, the adhesive can penetrate the entire thickness of the leather, fixing it and thus preventing the surface texture from developing during milling. Consequently, the leather is typically from 0.1 to 4 mm thick, more typically from 0.2 to 3.2 mm thick, or even 0.3 to 2 mm thick.

An advantage of the laminate is very thin leathers can be used which retain the unique surface texture obtainable by the method of the disclosure, are lightweight and flexible yet strong due to the reinforcing fabric. The laminates formed from thinner leathers are therefore particularly desirable.

Thinner leathers that are typically used include from 0.3 to 1.6 mm, or 0.3 to 1.2 mm, or even 0.3 to 0.9 mm, with 0.4 to 0.8 mm being the most preferred.

The method disclosed herein is most advantageous with thinner leathers, as the unique surface texture may be formed to provide very soft and supple leather. However, the leather is still very high strength due to the reinforcing layer, meaning that it can be used in a wide range of products.

Leather is a natural product that inevitably varies in thickness to some degree. Typically, the tolerated substance for a leather type is 0.2 mm, meaning that the sample thickness may vary by 0.2 mm over its area, such as 0.4-0.6 mm or 1.2-1.4 mm.

The thickness of leather can be calculated using Satra™ 1: 2004.

In principle, the leather can derive from any source, including cow hide, horse hide, goat skin, sheep skin, kangaroo hide and the like.

Leathers deriving from reptiles or fish have different surface properties on the skin side, and therefore develop a different surface texture during the method of the disclosure. Nevertheless, these types of leathers tend to have lower strengths (particularly fish leathers), and so can greatly benefit from being laminated to the reinforcing layer in accordance with the disclosure, to provide high strength laminates having unique surface textures.

Even so, preferably the leather is a mammal or marsupial leather (i.e. derives from a hide from a mammal such as a cow or horse, or a marsupial such as a kangaroo). Mammal leathers are most often used.

The method of the disclosure provides a characteristic and aesthetically pleasing surface texture to the second side of the leather. Typically therefore the first side of the piece of leather is the flesh side, and the second side of the piece of leather is the skin side.

Desirably, the leather is full grain leather or top grain leather.

In this context, "top grain leather" corresponds to grain leather (i.e. leather which has been separated from the split layer) wherein the top surface has been sanded. Top grain leather as used herein includes nubuck leather.

Step ii. —Laminating the Reinforcing Fabric

The laminating step comprises bonding a reinforcing fabric to the piece of leather using an adhesive.

The reinforcing fabric provides strength to the laminate, allowing the leather layer to be thin and the overall laminate to be flexible. The reinforcing fabric is therefore relatively thin and has high tensile strength, high tear strength and low elongation at break.

Suitably, the basis weight for the reinforcing fabric is below 150 $g/m^2$, typically below 100 $g/m^2$, more typically below 75 $g/m^2$, and most typically below 60 $g/m^2$.

A suitable method for measuring the basis weight of the reinforcing fabric is ASTM D3776.

Suitably, the ultimate tensile strength (breaking strength) of the reinforcing fabric is above 5 kN/m, more typically above 10 kN/m, or even above 15 kN/m.

The ultimate tensile strength expressed in kN/m is the pulling force required to break a 1 m wide sample of the material. A suitable test for measuring the ultimate tensile strength of the reinforcing fabric is ISO 3376: 2011. An alternative test specifically adapted for testing tensile properties of polymer matrix composites which could be used is ASTM D3039.

Suitably, the elongation at break of the reinforcing material (i.e. the elongation of the fabric when stretched to its breaking point) is less than 5%, typically less than 4%, or even less than 3%.

A suitable test for measuring the elongation at break is ISO3376:2011. An alternative test specifically adapted for testing the elongation properties of polymer matrix composites which could be used is ASTM D3039.

Suitably, the tear strength of the reinforcing material is above 25 N, typically above 50 N, or even above 75 N.

A suitable method for measuring the tear strength of the reinforcing material is ISO 3377-1:2011. An alternative test specifically adapted for testing the tear strength of polymer matrix composites which could be used is Mil-C-21189 10.2.4.

It will be clear from the above characteristics that the reinforcing fabric is very low basis weight (and hence typically very thin) yet typically has very high tensile strength and tear strength. Suitable materials that fulfil these requirements include fabrics which include at least one layer comprising high strength fibres.

By "high strength fibre" is meant a fibre having an ultimate tensile strength of above 1500 MPa. A suitable test for measuring the ultimate tensile strength of the fibre is ASTM D3822.

Typical high strength fibres include carbon fibres or high tensile strength polymeric fibres, with suitable high tensile strength polymeric fibres including polyethylene (particularly UHMWPE), polyaramid, polybenzoxazole, and polyaromatic esters.

Suitable high strength fibres that can be used in the reinforcing fabric therefore include carbon fibre, UHMWPE fibres such as Dyneema® available from DSM or Spectra® available from Honeywell; polyaramid fibres such as Kevlar® available from DuPont; polybenzoxazole fibres such as Zylon® available from Toyobo; and polyaromatic esters such as Vectran® available from Kuararay, Inc.

In this context, UHMWPE is "ultra-high molecular weight polyethylene", which is sometimes also referred to as high-modulus polyethylene (HMPE) or high-performance polyethylene (HPPE). UHMWPE is typically characterised by having an intrinsic velocity of at least 4 dl/g, desirably at least 8 dl/g. Generally, the intrinsic viscosity is less than 50 dl/g, typically less than 40 dl/g.

A suitable methodology for measuring intrinsic viscosity is ASTM D1601-2004 (at 135° C. in decalin, dissolution time 16 hours, with DBPC as an anti-oxidant in an amount of 2 g/l solution, by extrapolating the viscosity as measured at different concentrations to zero concentration).

The at least one layer in the reinforcing fabric comprising the high strength fibres may be woven or nonwoven. However, in order to benefit from the strength properties of the fibres, typically the at least one layer will contain the high strength fibres in an oriented fashion, such as woven (including uniweave), monodirectional or multidirectional fabrics.

Typically, the reinforcing fabric will comprise at least one layer having parallel high strength fibres. Said parallel high strength fibres may optionally be embedded in a resin matrix.

By "monodirectional fabrics" and "multidirectional fabrics" is meant fabrics formed with layers of oriented fibres embedded in a resin matrix, with multidirectional fabrics typically containing several layers of oriented fibres arranged orthogonally to one another (e.g. oriented at 0° and 90°, or at 0°, 45°, 90° and 135°), with optionally each layer being bound together by resin, or all the oriented layers being embedded in a continuous resin matrix.

The reinforcing fabric may be a multilayer composite which contains further layers in addition to the layers comprising the high strength fibres. For instance, nonwoven fabrics may be included on one or both sides of reinforcing fabric, in addition to the at least one layer comprising the high strength fibres. This can improve the feel of the reinforcing fabric.

A particularly suitable reinforcing fabric is Dyneema® CTH2M2 available from DSM, which comprises nonwoven polyester fibre layers on either side of a multidirectional fabric containing 0°/90° oriented layers of Dyneema® fibres. The tensile strength of the fabric is about 16 kN/m, the basis weight is 36 g/m$^2$, the tear strength is 80 N and the elongation at break is 2.5%.

Another suitable reinforcing fabric is Dyneema® CTM2HBH2 also available from DSM, which comprises nonwoven polyester fibre layers on either side of a multidirectional fabric containing 0°/45°/90°/135° oriented layers of Dyneema® fibres. The tensile strength of the fabric is about 18 kN/m, the basis weight is 56 g/m$^2$, the tear strength is 463 N and the elongation at break is 2.5%.

The adhesive can in principle be any adhesive capable of bonding leather. Suitable adhesives are known in the art and would be familiar to the skilled person.

Typically, the adhesive is used in combination with a hardener to aid in the bonding. Suitable levels of hardener are up to 20%, more typically up to 10%, for instance 95% adhesive, 5% hardener.

Specific adhesives and hardeners that have been used in combination include Helmitin® DS/17, available from Helmitin Adhesives, together with Swift Hardener 9538 Blue. This combination can be applied by spraying on to the leather.

As leather is absorbent, the adhesive typically soaks into the leather after it has been applied which provides a stronger bond.

The adhesive is applied at a suitable level to ensure the reinforcing fabric forms a strong bond to the leather. Typical levels if applying by spray are around 15 to 60 g/m$^2$, e.g. around 20-40 g/m$^2$. However, these levels are dependent on the concentration of the adhesive in the solution. It would nevertheless be within the ability of the skilled person to adjust the level of adhesive accordingly to achieve the desired bonding strength to avoid delamination during use.

The laminating step typically comprises the following steps:
applying an adhesive on the first side of the piece of leather; and
contacting a reinforcing fabric with the adhesive.

The applying step may be by any means, including spraying, brushing or with rollers. However, spray adhesives can lead to clogging of the spray gun nozzle, and so typically the adhesive is applied by a rollercoater in commercial production.

The adhesive layer on the leather can be contacted with the reinforcing fabric immediately after application. However, typically bonding is better if the adhesive is allowed some time to soak into the leather, for example a soaking step of from 5 seconds to 1 hour, more typically 1 minute to 45 minutes, e.g. 5 minutes to 30 minutes.

The adhesive can also benefit from such a curing step as it can partially dry, improving its tackiness and capability to bond to the reinforcing fabric. However, if the delay between applying the adhesive and contacting the reinforcing fabric is too long, the adhesive may no longer be capable of forming a strong bond with the reinforcing fabric. Consequently, it is desirable to contact the reinforcing fabric while the adhesive retains some tackiness.

Step iii. should only be carried out once the adhesive has fully dried and properly bonded to the reinforcing fabric. Consequently, there is typically a drying step of at least 10 minutes prior to roll milling, more typically at least 1 hour, more typically at least 4 hours, e.g. at least 8 hours. Often, the laminates are left overnight to ensure the adhesive is fully dried prior to milling.

In order maintain a successful bond throughout the remaining processes the adhesive may require heat and/or force to aid in bonding the leather and reinforcing fabric. Therefore, the method optionally includes a bonding step after the reinforcing fabric is contacted with the adhesive.

Typically, bonding is achieved by passing the laminate through a roller (e.g. a rotopress), such as a heated roller. So as not to damage the second side of the leather, suitably at least of the rollers is compressible, such as a felt roller, a rubber roller, a foam roller or the like.

If the laminate is heated, the temperature should not be too high or else the reinforcing material may become structurally compromised or the leather may discolour. Suitable maximum temperatures are 25° C. below the melting point of the high strength fibre or 115° C., whichever is lower.

If the high strength fibres can tolerate higher temperatures, it may be possible to form the laminate with a hot melt adhesive from a multilayer structure comprising the reinforcing fabric, hot melt adhesive and leather, such that heat and pressure are applied to allow the adhesive to melt and flow forming the bond between the reinforcing fabric and leather. Such a hot melt adhesive could be included in the laminate by any means, including as part of the reinforcing fabric, as a separate layer, or applied to the leather. However, if forming the leather laminate in this way, care must be taken not to expose the leather to overly high temperatures particularly for extended periods, in case the leather becomes discoloured.

Possible processing steps in step ii. of the method therefore include:
  applying an adhesive to the first side of the piece of leather, for example as a spray;
  optionally allowing the adhesive to soak into the leather, for example in a curing step of from 1 to 30 minutes;
  contacting a reinforcing fabric with the adhesive to form a multilayer structure comprising a layer of the reinforcing fabric, a layer of the adhesive and the leather;
  optionally applying heat and/or pressure to the multilayer structure, for example by passing the multilayer structure through the nip of a heated roller; and
  optionally allowing the adhesive to dry, for example in a drying step of at least 8 hours The multilayer structure preferably comprises the reinforcing fabric in contact with the adhesive, with said adhesive also being in contact with the first side of the leather (i.e. there are not intervening layers between the reinforcing fabric and the adhesive or the adhesive and the first side of the leather).

Step iii—Exposure to Water and Milling

The key features of the third step are the exposure to water which causes the leather swell, in combination with the mechanical action of the dry milling which forms the distinctive surface texture. However, these two features in combination are not sufficient to allow the surface texture to develop. As shown by the examples below, when otherwise identical samples of leather that lack the high strength backing layer are exposed to identical conditions, very little surface texture develops.

Following dry milling, the leather is not saturated with water such that the surface texture is only present due to a temporary swelling effect. Instead, the surface texture is permanently imparted to the leather. If a pre-soak is used (i.e. the method includes step iii"), the dry milling removes the excess water, simultaneously causing the laminate to shrink and the surface texture to develop. If dry milling in humid air is carried out, the water is thought to continuously exchange with the leather, providing a laminate with the surface texture in the leather layer.

Without wishing to be bound by theory, it is believed that the water causes the leather to swell and expand, but this dimensional change is constrained by the backing layer in the laminate. The mechanical action of the milling disrupts the leather's structure and allows the distinctive texture to develop in the laminate. As the texture develops, the overall dimensions of the laminate actually reduce. This is evident in the backing layer of the laminate (i.e. the high strength fabric layer), which also begins to develop a roughened texture during the process of ridges and valleys due to the contraction of the laminate as a whole.

In contrast, a non-laminated sample of leather is thought to be able to expand when exposed to water, and subsequently contract as the water is removed. The absence of the reinforcing fabric means that the changes in dimension can be accommodated without these forces leading to the distinctive surface being formed.

In step iii", the laminate is soaked in a solution comprising water prior to dry milling. The purpose of this step is the increase the water content of the leather layer prior to the dry milling. In view of this, the exact details of the soaking step can be varied.

For instance, the soaking step may additionally include mechanical action on the leather, such as washing.

Alternatively, the laminate may be soaked by simply placing the laminate in a solution comprising water.

Typically, the water is warm water, for instance from 25 to 50° C., more typically from 30 to 40° C.

The solution comprising water may simply be water. However, other chemicals may be present in line with standard leather production practices (antimicrobials, colouring agents and the like).

Typically, the laminate is soaked to increase the water content of the leather layer to >85% saturation (i.e. >85% of the total water content that can be held by the leather layer), more typically >90% saturation.

The laminate can be soaked to ensure the leather layer reaches 100% saturation. However this is not essential, as the surface texture can develop at lower levels of saturation.

A typical soaking step for step iii" comprises washing with water for up to 4 hours, for instance 1-3 hours. The washing can suitably be done in a retaining drum.

In step iii", the laminate having increased water content (i.e. having water content in the leather layer >85% saturation level) is then subjected dry milling.

Notably, in step iii', the water is introduced into the leather layer in the dry milling step itself by exposure to the humid air. A process which includes step iii' therefore preferably does not include a soaking step (i.e. the laminate is not soaked, immersed or otherwise exposed to a solution comprising water so as to increase its water content).

The water content of the leather layer of the laminate prior to dry milling in step iii' is preferably <90% saturation level, more preferably <85%, more preferably <80%.

The dry milling step utilises a standard dry milling drum to mill the leather laminate, except that the humidity is controlled to ensure humid air is used in step iii', while the humidity level is controlled to ensure humidity is removed during step iii"

In this context, by "humid air" is meant air with a relative humidity of 70% or above. Typically, the relative humidity will be 75% or above, for instance about 80%.

Thus, in step iii', the humidity of the air used in the dry milling is controlled to maintain it at around 70% (or 75% or 80% as the case may be), while in step iii" the humidity is controlled to ensure the humidity level is kept below 70% relative humidity, more typically below 60% relative humidity.

In step iii", the laminate (at least at the beginning of the process) has a high water content in its leather layer. The dry milling will typically cause the laminate to dry out, which makes the humidity level in the drum increase.

The dry milling in step iii" may comprise dry milling in air while controlling the relative humidity to be below 70%, more desirably below 60%.

One way of controlling humidity to lower levels during step iii" is to vent the drum allowing ambient air to replace the humid air which has built up during milling as the leather dries.

Typically, the dry milling is done at above standard room temperature, for instance at 30° C. or above, typically from 30° C. to 50° C., for instance from 35° C. to 45° C., e.g. about 40° C.

The speed and time of the dry milling is not overly critical, provided that the leather laminate is subjected to sufficient amounts of physical manipulation. Typical milling speeds and run times can therefore be used.

By way of guidance, suitably the dry milling is carried out at from 10 to 40 rpm (revolutions per minute), typically from 10 to 30 rpm, or more particularly from 15 to 25 rpm.

The run time of the dry milling will typically be at least 30 minutes, more typically at least 60 minutes, most typically at least 90 minutes. There is no upper limit of the time, although run times of longer than 18 hours or so are typically not needed, as the characteristics and appearance of the leather laminate would not change any further after this amount of time. A common run time in dry milling is around 4 to 12 hours.

The skilled person would be aware that dry milling processes often involve multi-step cycles, and may further include a pre-heat step and/or final conditioning steps. These steps and further additional steps may also be included in the dry milling of the leather laminate, provided that the process includes at least the step of dry milling in humid air as described above.

Similarly, the dry milling is intended to tumble the leather laminate in a drum, subjecting it to constant physical stresses. The skilled person would be well aware that in order for dry milling to be successful, the drum must be loaded to the correct level. Too low of ballast weight in the drum or if the level of physical manipulation of the samples caused by milling is low, in which case the milling may need to be carried out for longer. Too high of ballast weight in the drum and the samples do not have the freedom to move and tumble. Loading the drum to the correct level is well within the remit of the skilled person. Of course, the drum does not need to be loaded exclusively with leather laminates, other samples may be included to ensure the drum is loaded to the correct level during dry milling.

Likewise, although step iii. is described as "dry milling", there may be some chemicals added during the milling such as softeners, conditioners, antistatic agents, and dye fixation agents, as is common in the art.

The dry milling permanently affects the leather laminate, causing a unique and aesthetically pleasing surface texture to develop on the second surface of the leather. Without wishing to be bound by theory, it is believed that the water and (if used) elevated temperatures cause the piece of leather to swell and expand. However, the adhesive and reinforcing fabric prevent the laminate from stretching. The expansion is therefore constrained by the reinforcing fabric. The only part of the leather that can accommodate the expansion is the second surface. Following milling, the leather contracts slightly augmenting the surface structure and also imparting a characteristic surface structure to the reinforcing layer. The resultant laminate is left with a permanent characteristic texture on the surface (typically both surfaces) that remains indefinitely even as temperature and humidity are subsequently varied.

By way of guidance, at least one dimension of the laminate typically reduces by at least 3% during step iii', more typically at least 4% or even at least 5%.

The increased water uptake that occurs during step iii" often leads to a greater change in size of the laminate.

Thus, at least one dimension of the laminate typically reduces by at least 5% during step iii", more typically at least 6% or even at least 7%.

The leather laminates formed by the method are therefore strong and flexible, and have a characteristic and aesthetically pleasing surface texture which can be described as a random (or non-uniform) pebbled grain like surface.

A notable advantage of the method of the disclosure is that original surface texture can often be maintained. For instance, when using leather having a velvet-like surface such as nubuck leather, the method allows the aesthetically pleasing surface texture (i.e. the random (non-uniform) pebbled grain-like surface) to develop while still maintaining the velvet-like surface. This is typically not possible when artificially embossing leather surfaces, as the embossing step can damage the lap structure of the velvet-like surface.

The exact nature of the surface texture can be varied by varying the conditions used in step iii, such as the soak conditions in step iii" (soak time, use of mechanical action such as washing), humidity level of the milling in step iii', and conditions (temperature, time) of the dry milling. Likewise, the thickness of the piece of leather as well as how much the adhesive penetrated the leather can have an effect on how the surface texture manifests itself.

The level of adhesive penetration is thought to be significant as, once dried, the adhesive works in combination with the reinforcing fabric effectively fixing the first side of the piece of leather. If the adhesive penetration is through the entire leather sample, then the adhesive may prevent the leather expanding due to the water and hence prevent the surface texture developing. This is particularly the case when the piece of leather is very thin.

As a consequence, the penetration of the adhesive into the piece of leather is typically less than 50%, desirably less than 25%.

By "penetration" is meant how far the adhesive soaks through the piece of leather as a percentage of the distance from the first side (where the adhesive is applied) to the second side.

Further processing steps may be carried out following dry milling, for instance resizing (e.g. cutting into blanks ready for assembly into an article), and forming a multicomponent article comprising the leather laminate (for instance a shoe, bag, luggage, clothing, furniture, car trim or the like).

The present disclosure also relates to a leather laminate formed by the method described herein.

The present disclosure also relates to a leather laminate comprising a reinforcing fabric bonded to a leather layer which has undergone exposure to water and dry milling, said reinforcing fabric comprising high strength fibres, particularly which has undergone step iii' or step iii" of the method described herein.

Typically, the leather laminate of the disclosure comprises a reinforcing fabric bonded to a leather layer with an adhesive.

The leather laminate of the disclosure is characterised by a random (or non-repetitive) pebbled grain-like structure on the leather surface. Preferably, the reinforcing layer of the laminate also has a random (or non-repetitive) pebbled grain-like structure.

The structure may also be described as a shrunken, grain-like structure.

Typically, the pebbled grain-like structure is reduced when the laminate is stretched, for instance during bending.

By "grain-like structure" or "pebbled grain-like structure" is meant a surface structure made up of a continuous 2-D network of low features (cracks) that surround raised features (grains), wherein the distance between the grains (i.e. the distance across the cracks) is small compared to the distance across the grains (typically the distance across the grains is at least three times the width of the cracks, for example when 10 grain and crack pairs are measured). In this way, when viewed from above the cracks (i.e. the low points in the surface structure) are similar to grain boundaries and the grains (i.e. the raised features) are similar to grains in a sample of metal.

This type of surface texture on leather is typically called pebbled leather in the art.

The milling process used to form the laminate of the disclosure provides a combination of mechanical working as well as swelling caused by the water, which means the grains formed on the surface are uniquely shaped and typically have a low aspect ratio, such as below 5, more typically below 3 or even below 2.

By "uniquely shaped" is meant that each of the grain structures has a shape which is usually different from the other grains that surround it, with any similarity between two grains in the surface as a whole being a coincidence which does not give rise to a discernible repeating pattern.

By "aspect ratio" is meant the ratio of the largest dimension of the grain to the smallest dimension, when measured from above. When measuring the aspect ratio, typically 10 grains are chosen from the sample.

The size of the grains (i.e. both the width and vertical height) can be controlled by a number of factors, including the thickness and type of leather used, and the milling conditions.

Nevertheless, by way of guidance, the grain size is typically from 0.5 to 5 mm, more desirably from 0.5 to 3 mm or even from 1 to 2 mm.

A suitable way to determine the grain size is by averaging the largest dimension of typically 10 grains chosen from the sample.

The grain height is typically from 100 to 500 microns, more typically from 200 to 400 microns.

By "random" (or "non-repeating") is meant that the pebbled grain-like structure does not repeat over any part of the surface of the leather layer, such that any two 1 cm² sample areas taken from different parts of the surface are not the same.

It is worth noting that the grain-like structure of the leather surface and the grain-like structure of the reinforcing layer are not necessarily the same. They may have different grain sizes and/or grain heights, as well as different grain morphologies.

By "reduced during bending" is meant that the following relationship is satisfied:

$\Delta H \geq 75\%$ when bending to a bend radius of R, wherein
R=5*t when t>1 mm, and
R=5 mm, when t≤1 mm,
t is the thickness in mm of the combined reinforcing layer and leather layer in the laminate (as measured by ASTM D1814-70 (2015)), and $$\Delta H = 100 * \left(1 - \frac{(H_{initial} - H_{final})}{H_{initial}}\right)$$

$H_{initial}$ is the vertical difference between the high points of the grains and low points of the cracks separating grains when the laminate is flat, and $H_{final}$ is the vertical difference between the high points of the grains and low points of the cracks separating grains when the laminate is bent with a bend radius of R.

As noted, t is the thickness in mm of the combined reinforcing layer and leather layer in the laminate. In practice, it is the leather layer that is important. However, this cannot easily be separated from the reinforcing layer without risk of damage to the leather. Therefore, for the purposes of this test, the thickness of the laminate including the reinforcing layer is taken. In practice, the reinforcing layer is typically very thin in comparison to the leather layer, so the difference in thickness between the overall laminate and leather layer is often barely measurable using the SATRA test. However, any backing layers connected to the reinforcing layer (such as foam layers or other support layers) should be disregarded.

$H_{initial}$ and $H_{final}$ represent the depth of the grain structure in the surface of the leather when the laminate is flat and when bent to a bend radius R. The value $\Delta H$ therefore represents the change in texturing of the surface as the laminate is bent.

Preferably:
$\Delta H \geq 90\%$
More preferably:
$\Delta H \geq 95\%$

Being a natural material, leather itself is relatively stretchy. However, when bonded to the high strength fabric after step ii, the laminate effectively loses its stretchiness compared to natural leather.

Thus, the non-bonded leather layer typically has an elongation at break of at least 10% without tearing, typically even more for instance at least 15%.

In the laminate prior to dry milling, the leather is restricted by the high strength fabric, and will typically have an elongation at break of less than 5%, more typically less than 4%, or even less than 3%.

The pebbled grain-like structure is primarily formed from the reduction in size of the laminate during dry milling. This dimensional change manifests causes the high strength fabric to crinkle up, meaning that after step iii, the laminate will typically have an elongation at break of by at least 5%, more typically at least 6%, or at least 7% or even at least 8%.

Stretching the laminate in this way will of course reduce the surface texture, as in part the grains arise due to the crinkling that occurs during the contraction that happens when dry milling. This is in contrast to artificially embossed leathers, which often retain their surface structure even when stretched or bent. The resultant surface texture of the leather of the disclosure therefore has a very natural appearance when formed into shaped articles and during use.

Thus, viewed in one way the leather laminate of the disclosure comprises a reinforcing fabric bonded to a leather layer, said reinforcing fabric comprising high strength fibres, wherein the surface of the leather layer and the surface of the reinforcing fabric each have a non-uniform, pebbled grain-like structure.

The leather laminate of the disclosure may also be viewed as comprising a reinforcing fabric bonded to a leather layer, said reinforcing fabric comprising high strength fibres and having an elongation at break (i.e. the elongation at break of the reinforcing layer alone) of less than 5% (or less than 4% or even less than 3%), wherein the leather laminate has an elongation at break of more than 5% (or more than 6 or more than 7% or even more than 8%).

Typically, one would expect the elongation at break of a multicomponent laminate to be equal to the elongation at break of the least elongatable layer. However, the elongation of break of the leather laminate is higher than the reinforcing fabric because the laminate has been shrunk to create the pebbled, grain-like structure.

Desirably, the leather layer in the laminate is thin, with the overall laminate typically having a thickness in line with the thicknesses of the leather layer set out in Step i. above, namely typically from 0.1 to 4 mm thick, or from 0.2 to 3.2 mm thick, or from 0.3 to 2 mm thick, or from 0.3 to 1.6 mm, or from 0.3 to 1.2 mm, or even from 0.3 to 0.8 mm.

The thickness of leather laminate can be calculated using SATRA™ 1:2004

Desirably, the leather layer in the leather laminate of the disclosure derives from top grain leather.

Desirably, the leather layer in the leather laminate derives from nubuck leather. Desirably, the nubuck leather has a velvet-like surface.

Desirably, the flesh side of the leather is bonded to the reinforcing layer in the leather laminate of the disclosure. In this way, the skin side of the laminate has the grain-like surface texture.

The present disclosure also relates to a personal item comprising, or made from, the leather laminate disclosed herein. In particular, the personal item may be footwear, an item of clothing, or a container.

Preferably, the disclosure relates to footwear comprising, or made from, the leather laminate disclosed herein.

Suitable footwear that could comprise, or be made from, the leather laminate include work boots, sport shoes, casual shoes, formal shoes, or sandals.

Preferably, the disclosure relates to a container comprising, or made from, the leather laminate disclosed herein.

Suitable containers that could comprise, or be made from, the leather laminate include bags such as backpacks, handbags, sports bags, travel backs and the like; wallets, pouches, and the like.

Preferably, the disclosure relates to an item of clothing comprising, or made from, the leather laminate disclosed herein.

Suitable items of clothing that could comprise, or be made from, the leather laminate include jackets, trousers, hats, belts, gloves and the like, particularly jackets.

EXAMPLE 1

A 1 mm thick sample of top grain leather was skin side down and the flesh side was sprayed with adhesive. The adhesive was left to dry for 20 minutes, then Dyneema CTM2H2 fabric was placed on the adhesive. The resulting laminate was passed through a Rotopress machine having a metal roller heated to 110° C. and a felt roller with the felt roller in contact with the leather side of the laminate. The laminate was then left overnight to allow the adhesive to fully dry.

The sample was then dry milled in a drum roller at in air at 40° C. at 80% relative humidity.

Figure 1:
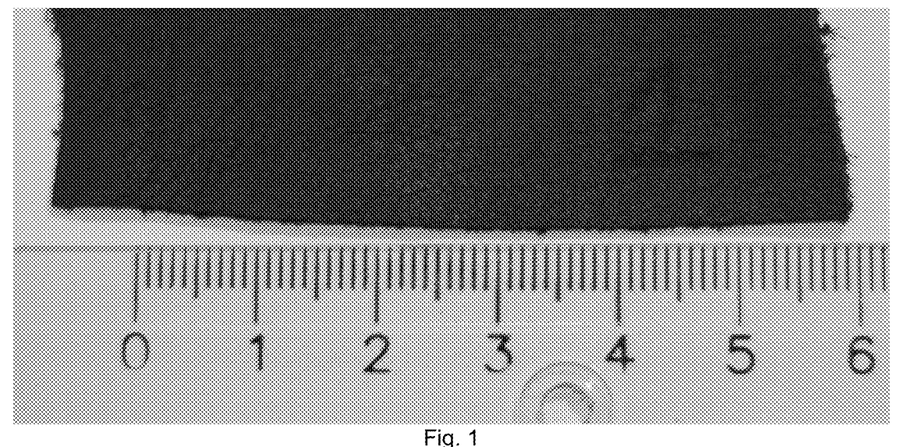
Figure 2A:
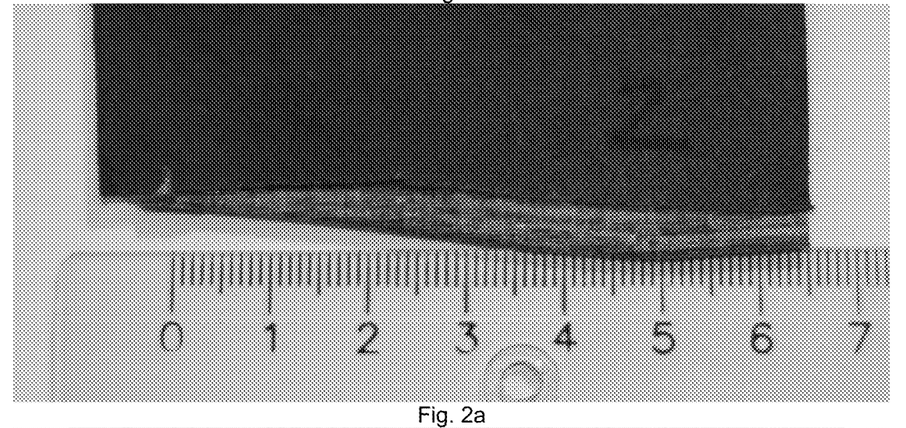
Figure 2B:
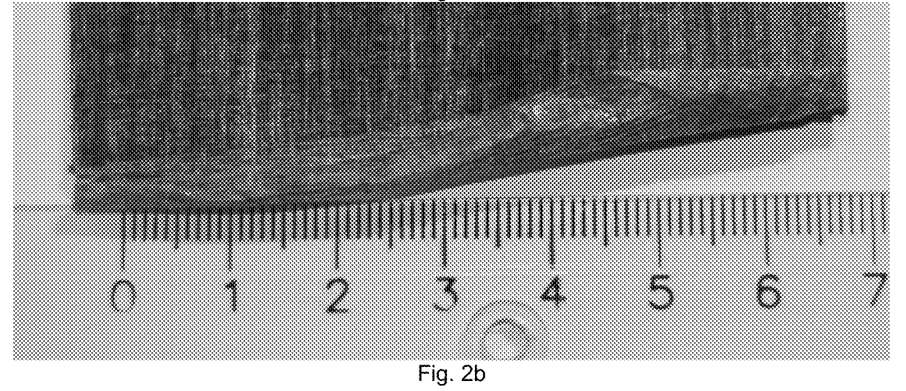

FIG. 1 shows the top grain leather prior to coating with the adhesive. FIG. 2a shows the leather side of the laminate prior to dry milling, with FIG. 2b showing the reverse side. Close inspection of FIGS. 1 and 2a show that there is some grain structure naturally present in the leather, but this is not present on the reverse side of the laminate prior to dry milling. Instead the reverse side of the laminate closely resembles the surface texture of the reinforcing fabric prior to lamination.

Figure 3A:
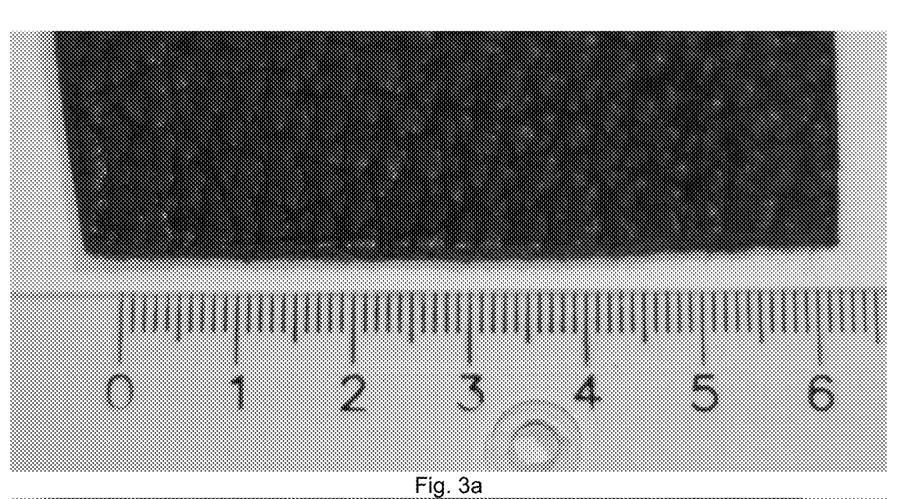
Figure 3B:
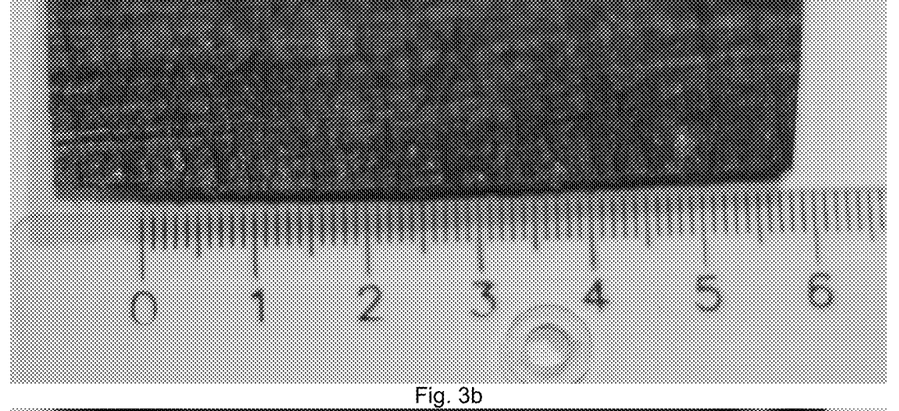
Figure 3C:
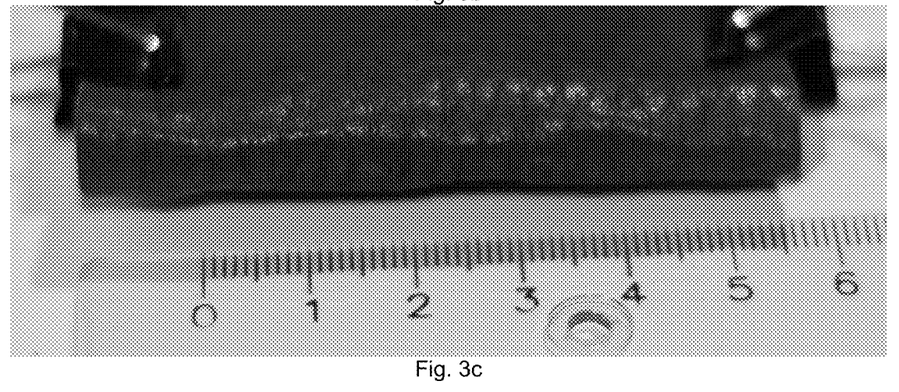

FIG. 3a shows the laminate following dry milling with the pronounced grain-like structure being developed. FIG. 3b shows the reverse side of the laminate, with the grain-like structure clearly evident in the reinforcing layer. FIG. 3c shows that the grain-like structure becomes much less pronounced when the laminate is bent.

EXAMPLE 2

Figure 4:
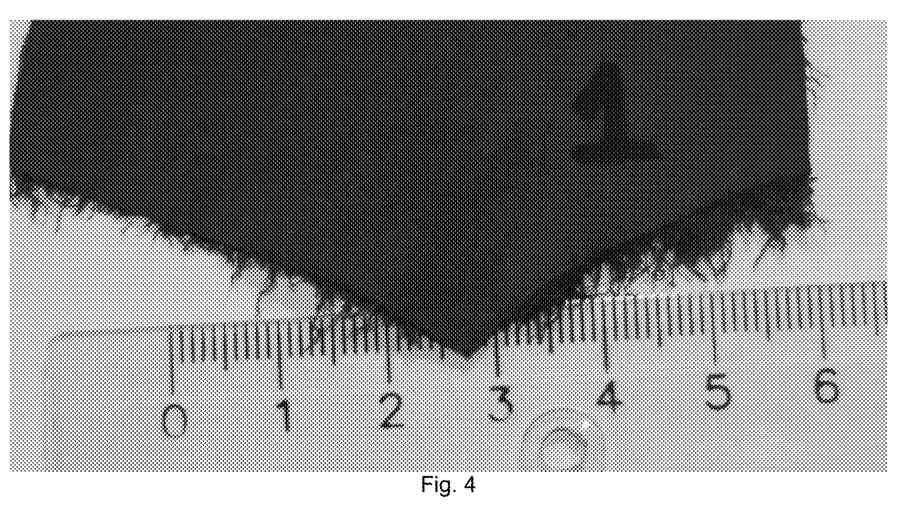
Figure 5A:
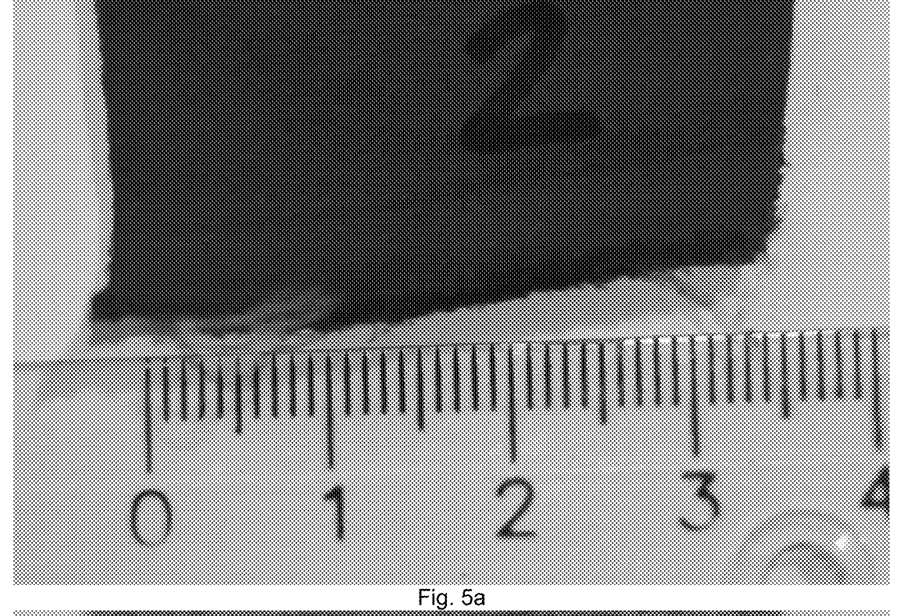
Figure 5B:
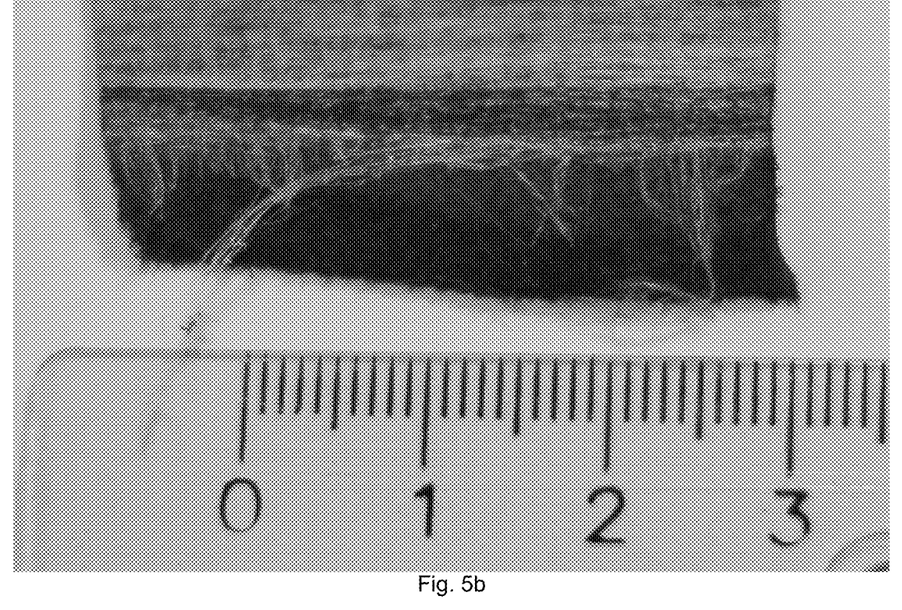

Example 1 was repeated using a 1 mm thick nubuck leather sample. FIG. 4 shows the sample prior to lamination, with FIGS. 5a and 5b showing the front and back sides of the laminate prior to dry milling. As with Example 1, a very fine pebbled structure is evident in the nubuck leather sample, but this is not evident on the reverse side of the laminate prior to dry milling. Instead, the surface texture closely resembles that of the reinforcing layer prior to lamination.

Figure 6A:
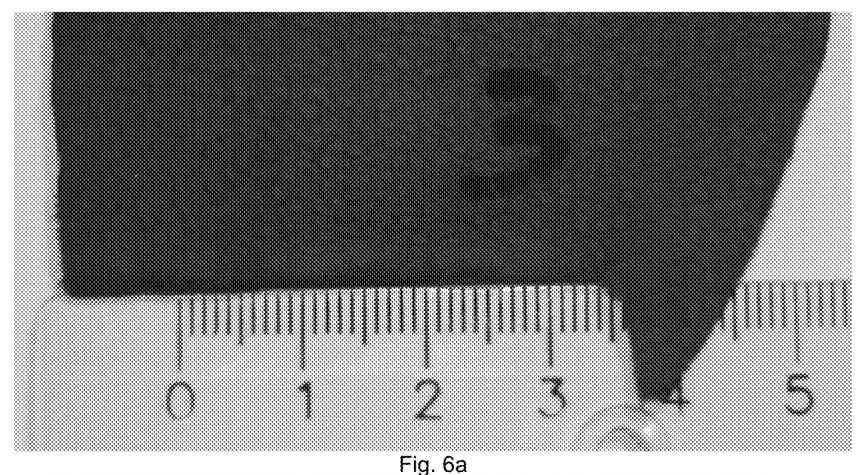
Figure 6B:
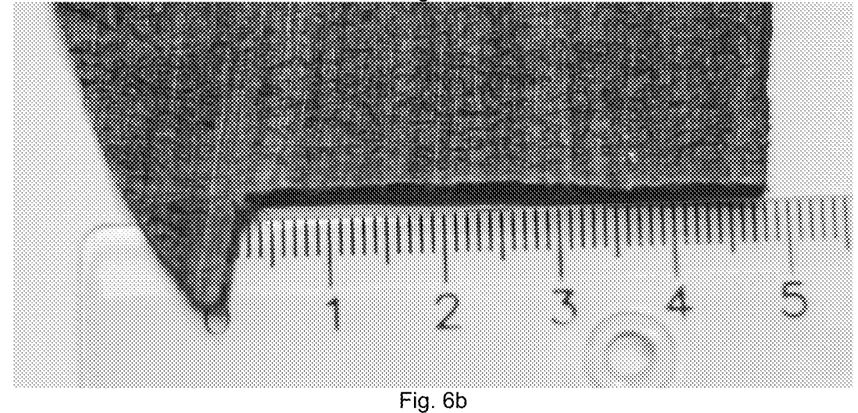
Figure 6C:
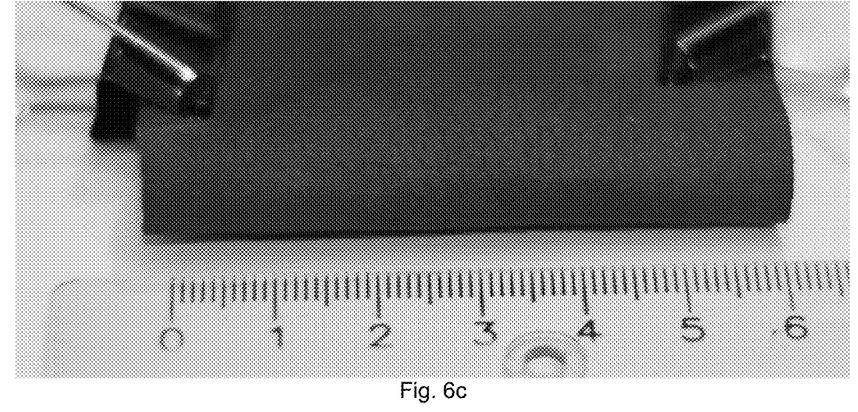

FIG. 6a shows the laminate after dry milling, with the pronounced shrunken pebbled texture clearly evident. FIG. 6b shows the reverse side of this laminate, with the grain like structure present on the reinforcing layer. FIG. 6c shows that the grain-like structure is significantly reduced when the laminate is bent.

Figure 7:
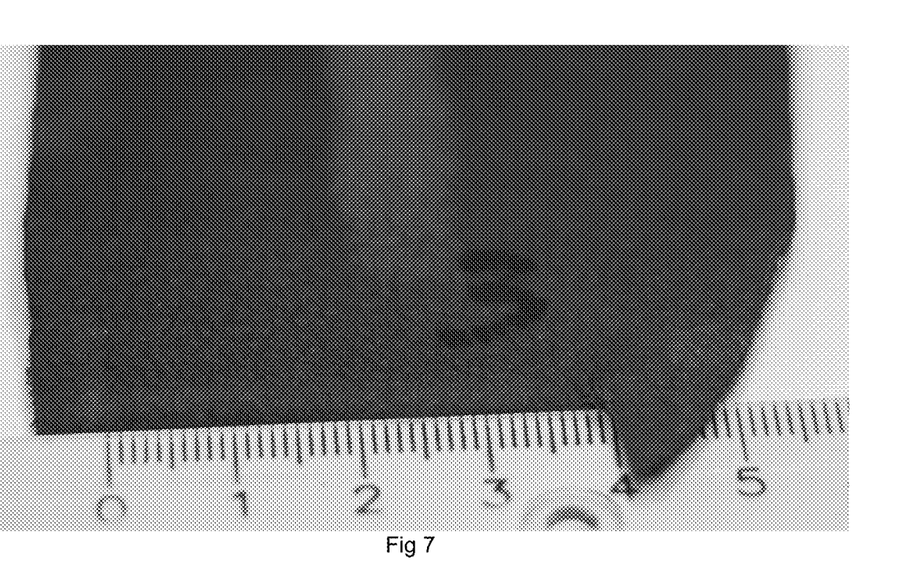

FIG. 7 shows the same dry milled laminate with a finger trail on the surface. The finger trail was formed by first brushing the entire surface in a first direction (in this case towards the ruler), then dragging a fingertip in the opposite direction (in this case away from the ruler). The figure shows the fingertip leaving a trail meaning that the nubuck leather has developed the grain-like structure through dry milling while retaining its velvet-like surface.

EXAMPLE 3

Three 30 cm by 30 cm samples of top grain leather were subjected to the following processes:
Sample 3-1 was dry milled at 40° C. and 80% humidity for 3 hours Sample 3-2 was laminated to a fabric containing Dyneema fibres, then dry milled at 40° C. and 80% humidity for 3 hours under identical conditions to Sample 3-1.

Sample 3-3 was laminated to a fabric containing Dyneema fibres, soaked in water then dry milled at 40° C. with the drum being intermittently purged to reduce the humidity to ambient levels.

Figure 8:
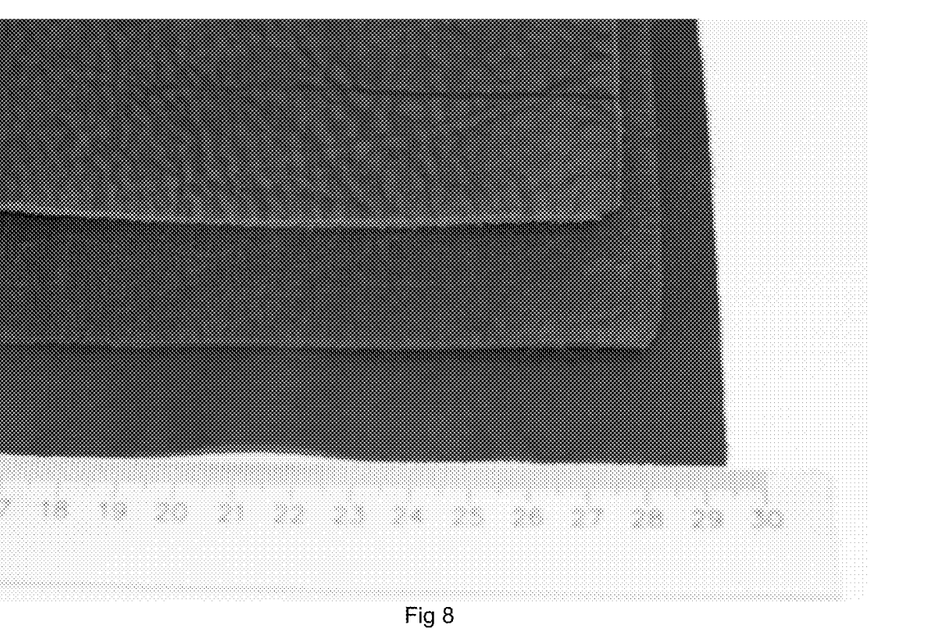

FIG. 8 shows the three samples after these processes laid out with their left edges lined up, stacked (in order) as 3-1, 3-2 and 3-3.

Although it has undergone a slight shrinkage (around 2%), the non-laminated sample shows very little surface texture and is almost indistinguishable from the non-milled leather.

Sample 3-2 shows a very even pebbled surface texture across its entire surface. It has shrunk in size by around 5.3% following the milling in humid air.

Sample 3.3 shows a more weathered texture with more pronounced pebbling and a larger colour difference between the grain peaks and grain valleys. It has also contracted more, reducing in size by about 7.7%.

The invention claimed is:

1. A leather laminate comprising a reinforcing fabric bonded to a leather layer, said reinforcing fabric comprising high strength fibres and having an elongation at break of less than 5%,
   wherein the leather laminate has an elongation at break of more than 5%, and
   wherein the leather layer of the leather laminate has a thickness larger than 0.3 mm and less than 0.8 mm.

2. The leather laminate of claim 1, wherein the reinforcing fabric has an elongation at break of less than 4%, and wherein the leather laminate has an elongation at break of more than 6%.

3. The leather laminate of claim 1, wherein the reinforcing fabric has an ultimate tensile strength of above 5 kN/m.

4. The leather laminate of claim 1, wherein the leather layer is top grain leather, with a flesh side of the leather being bonded to the reinforcing layer.

5. The leather laminate of claim 4, wherein the leather layer is nubuck leather.

6. The leather laminate of claim 1, wherein the surface of the leather layer has a non-uniform, pebbled grain structure.

7. The leather laminate of claim 1, wherein the reinforcing fabric comprises at least one layer having parallel high strength fibres.

8. The leather laminate of claim 6, wherein a grain size of the pebbled grain structure ranges from 0.5 mm to 5.0 mm.

9. The leather laminate of claim 6, wherein a grain height of the pebbled grain structure ranges from 100 to 500 microns.

10. The leather laminate of claim 7, wherein the at least one layer having parallel high strength fibres is embedded in a resin matrix.

11. The leather laminate of claim 7, wherein the at least one layer having parallel high strength fibres has an ultimate tensile strength of above 1500 MPa.

12. The leather laminate of claim 1, wherein the reinforcing fabric and the leather layer are bonded via an adhesive.

13. The leather laminate of claim 1, wherein the leather laminate is embodied in a shoe.

14. A leather laminate comprising:
   a bovine leather layer; and
   a reinforcing fabric bonded to the leather layer, the reinforcing fabric having an elongation at break of less than 5%,
   wherein the leather laminate has an elongation at break of more than 5%, and
   wherein the leather layer of the leather laminate has a thickness larger than 0.3 mm and less than 0.8 mm.

* * * * *